(12) United States Patent
Mower et al.

(10) Patent No.: US 11,685,531 B1
(45) Date of Patent: Jun. 27, 2023

(54) SEAT OCCUPANCY SENSING WITH ANALOG SENSORS

(71) Applicant: InterMotive, Inc., Auburn, CA (US)

(72) Inventors: Dan C. Mower, Grass Valley, CA (US); Erin M. West, Auburn, CA (US); Gregory E. Schafer, Reno, NV (US)

(73) Assignee: InterMotive, Inc., Auburn, CA (US)

( * ) Notice: Subject to any disclaimer, the term of this patent is extended or adjusted under 35 U.S.C. 154(b) by 0 days.

(21) Appl. No.: 17/083,598

(22) Filed: Oct. 29, 2020

Related U.S. Application Data (60) Provisional application No. 62/927,893, filed on Oct. 30, 2019.

(51) Int. Cl.
| | | |
|---|---|---|
| *B60N 2/00* | (2006.01) | |
| *B60R 22/48* | (2006.01) | |
| *B64D 11/06* | (2006.01) | |
| *B60N 2/28* | (2006.01) | |

(52) U.S. Cl.
CPC ............ *B64D 11/062* (2014.12); *B60N 2/002* (2013.01); *B60N 2002/2815* (2013.01); *B60R 2022/4816* (2013.01); *B60R 2022/4858* (2013.01); *B60R 2022/4891* (2013.01)

(58) Field of Classification Search
CPC ............ B60N 2/002; B60N 2002/2815; B60R 2022/4816; B60R 2022/4858; B60R 2022/4891
See application file for complete search history.

(56) References Cited

U.S. PATENT DOCUMENTS

| | | | | |
|---|---|---|---|---|
| 3,737,850 A * | 6/1973 | Kopp | ...................... | B60R 22/48 340/687 |
| 3,748,639 A * | 7/1973 | Dobedoe | ................. | B60R 22/48 340/687 |
| 3,859,625 A * | 1/1975 | Eggert, Jr. | .............. | B60R 22/48 180/278 |
| 3,864,668 A * | 2/1975 | Bickford | ................. | B60R 22/48 180/270 |
| 3,944,016 A * | 3/1976 | Yamamori | .............. | B60R 22/48 180/269 |
| 6,215,395 B1 * | 4/2001 | Slaughter | ................ | B60R 22/48 340/461 |
| 6,297,641 B1 * | 10/2001 | Mattes | ..................... | B60N 2/42 324/609 |

(Continued)

*Primary Examiner* — Frank B Vanaman
(74) *Attorney, Agent, or Firm* — Heisler & Associates (57) ABSTRACT

At least one analog load sensor, such as a force sensitive resistor is situated between upper and lower seat structures to generate a signal correlating with weight placed upon the seat. A vehicle has multiple seats fitted with sensors. Weight related information is communicated to a processor and an optional display, along with seatbelt latch sensor outputs to communicate to an operator if any seats are occupied without seatbelt latched. A weight force threshold for each seat is adjustable in one embodiment to customize the system to accommodate occupants of different weights and non-occupant loads of different weights. Loading information for the vehicle, such as total weight of occupants and/or objects on the seats and location of these loads upon the vehicle can be calculated and utilized to ensure that gross vehicle weight rating and load center of gravity and related parameters are within acceptable ranges.

10 Claims, 2 Drawing Sheets

(56) References Cited

U.S. PATENT DOCUMENTS

| | | | | |
|---|---|---|---|---|
| 6,362,734 B1* | 3/2002 | McQuade | ............... | B60R 22/48 340/439 |
| 2002/0043789 A1* | 4/2002 | Lichtinger | ........ | B60R 21/01556 280/801.1 |
| 2012/0027548 A1* | 2/2012 | Whitfield, Jr. | ............ | B65F 3/00 414/408 |
| 2014/0197942 A1* | 7/2014 | Tabaczynski | .......... | B60N 2/002 340/457.1 |
| 2015/0367857 A1* | 12/2015 | Kozu | .................... | B60W 40/13 701/70 |

* cited by examiner

SEAT OCCUPANCY SENSING WITH ANALOG SENSORS

CROSS-REFERENCE TO RELATED APPLICATIONS

This application claims benefit under Title 35, United States Code § 119(e) of U.S. Provisional Application No. 62/927,893 filed on Oct. 30, 2019.

FIELD OF THE INVENTION

The following invention relates to vehicle seat related sensors which detect occupancy and other seat status conditions. More particularly, this invention relates to vehicle seat occupancy sensors which utilize an analog signal to evaluate weight placed on the seat, as well as occupancy status and seatbelt use status, and which systems and methods process and present the information in a useful manner.

BACKGROUND OF THE INVENTION

Seat occupant sensing is used broadly today in the automotive industry. Dashboard indicators remind passengers to buckle their seat belts if passengers are detected. Supplemental Restraint Systems (SRS) detect the presence of occupants to know if an air bag deployment is appropriate in the event of a crash.

Current occupant sensing technology generally involves contact sensors in which sufficient weight on the seat brings two electrical conductors in contact with each other, essentially forming a switch closure, which is sensed by the vehicle's restraint control system. Currently used seat occupant sensors consist of flexible electrical conductors printed onto a flexible polymer substrate, such as polyimide film. Two layers of conductors on this substrate are sandwiched together with an insulating inner layer. The conductor sandwich has numerous contacts located strategically around the seat cushion. Each contact location has an opening in the insulating material which allows the conductors to touch when sufficient force is applied to the sandwiched flex circuit. Thus, a human occupant sitting in the seat can apply sufficient force to cause one or more of the sensor contacts to close, effectively simulating a switch closure to the sensing electronics. Connected electronics can thus determine the presence of an occupant. The polymer substrate naturally returns to its original flat shape when the compressive force of the occupant is removed, thus opening the circuit as conductors are no longer in contact with each other.

In typical automotive applications, numerous contact locations are spread around the seat bottom cushion and are usually wired in parallel in an effort to reliably detect different weights and shapes of individuals. Any one or more of the several contacts making a switch closure is interpreted to indicate the presence of an occupant. One disadvantage of such occupancy sensors is that they cannot reliably differentiate between human occupants and other objects, such as a book, grocery bag, or backpack.

As one example where current occupant sensors are deficient, school buses and other buses are a source of ongoing safety concern. Most public school buses today do not include seat belts. In the interest of increased vehicle safety, there are increasing mandates for seat belts to be required in school buses. Once the vehicles are equipped with seat belt restraints, the next challenge is ensuring compliance in their use, especially when children are being transported. Seat belt monitoring systems that provide the driver with the status of each seat location are being developed, with some already in use.

Monitoring the buckled status of seat belts is fairly easy and reliable, as a simple switch is incorporated into the buckle. Wiring the switch to monitoring electronics allows detecting when the seat belt tang is latched into the buckle mechanism. Detecting the presence of a human occupant in a seat, however, is more challenging. This must be done in order to alert the driver that a seat is occupied by an individual and not some other item, but that the seat belt has not been buckled.

Commercial aircraft configured for human transport have many similarities to buses, but already have seatbelts. Current seatbelts and seats on aircraft lack the sensors needed to allow for monitoring of compliance with seatbelt instructions, also, total weight and weight distribution could be monitored at the seat level for enhanced safety.

Force Sensitive Resistive material is currently manufactured under various names, such as "Velostat" (provided by Desco Industries of Chino, Calif.) and "Linqstat." In one embodiment, such FSRs are made of a polymeric foil (polyolefins) impregnated with carbon black. The resulting material is force sensitive and normally has a high electrical resistance, approaching infinite. When a force is applied, the slight compression of the sheet material causes the resistance to decrease. The measured resistance can be used to approximate the force applied. Two conductors are placed in contact with the FSR and the resistance of the FSR is measured by an electronic circuit.

Patents exist (U.S. Pat. Nos. 6,345,839; 6,598,900; JP2000512022; JP4188680; and JP2009509829) for using force sensitive devices as seat occupant sensors (typically digital and merely outputting a binary signal indicating a sensor switch being open or closed) with this technology of this invention, an analog output is provided with a value corresponding to the force applied to the seat bottom cushion.

SUMMARY OF THE INVENTION

This invention proposes using the force related analog signal provided by such sensors to allow dynamically changing or adjusting the threshold at which an occupant is detected (and for other useful purposes).

As an example, school buses carrying small children can have their force threshold adjusted downward to ensure detection, whereas vehicles primarily involved in transporting adults can adjust the threshold upwards, eliminating the false detection of lower weight objects such as books, bags, backpacks, etc., placed on a seat. Even if false triggers or other errors of prior art binary seat sensing systems are not entirely eliminated, they can be reduced so that operators can more efficiently address a smaller number of issues, such as with visual inspections of the vehicle interior to ensure that a weight detected in a seat without a seatbelt in use does not have a child on the seat (but rather perhaps a heavy backpack).

One embodiment of this invention uses Force Sensitive Resistors (FSR) as the force sensing device for occupant sensing. Force sensitive resistors can be thought of as a low-cost Load Cell. Load Cells are a common method for measuring force, weight, or load. They do this by measuring strain or deflection, and based on what the cell is connected to, the strain can be converted to a load, or force.

Using force sensitive material in place of binary "on-off" type switch closures in seat occupancy sensing allows determination of the approximate force or weight of the 'object' sitting in the seat. In vehicles such as school buses with a plurality of seats, the force sensing circuit can communicate this information from each seat (via wireless (RF, etc.) or various wired communications) to a central computing device, such as a tablet in the front of the bus near the driver. This allows the approximate weight or force applied to each seat to be interpreted and displayed on the central tablet, using application software on the tablet to interpret the force value received from each seat, and can determine if an occupant is sitting in the seat or not. Other information can also be communicated from each seat to the tablet or other central computing device, such as seat belt usage data.

The tablet software application can have a settable, adjustable threshold for determining the presence of an occupant. This is helpful for configuring occupant sensing in vehicles such as school buses which may transport light weight children. The same system can be used to transport adults (or other children), and allow a simple threshold setting on the tablet computing device. In more complex systems, a seating chart on the tablet (or other computer) can have zones of seats (or each seat) separately adjustable in threshold, such as to allow an operator to set the device to accommodate very light riders mixed in with heavier riders.

The resistance of the FSR sheet material can be measured by placing conductors in contact with the material and applying a small voltage and measuring the resulting current. The conductors can be placed on opposites sides of the material, or on the same side of the material. In both cases, current flows through the FSR and the electrical resistance is measured. There are a number of different configurations of sensors available today from several manufacturers for measuring force using this technology.

The FSR readings can be calibrated for the particular seat the sensor is installed in. A calibration step during the installation will improve the accuracy of the measurements. While this technology may not provide highly accurate passenger weight, due to part of the passenger weight being transmitted to the floor of the vehicle through their legs, it can be used to calculate an approximation of the passenger's weight. This information is of much greater value than just indicating the presence of an occupant. It can be used to estimate the total vehicle weight as described below.

Loading commercial vehicles such as trailers, box trucks, transfer trucks or transit buses beyond their Gross Vehicle Weight Rating and or the Gross Axle Weight Rating is a concern and safety issue to the operator and the general public. Using expensive load cells on each axle or wheel and alerting drivers to this issue has been prohibitively expensive. Since unloaded buses are weighed and are delivered with a published empty weight at each wheel, it is possible to weigh the additional load of passengers and cargo with FSR technology at each wheel location, report this information to a central head unit or tablet computing device. Application software on the tablet can sum the individual weights, along with the known empty weight of the bus at each wheel, and display the new vehicle weights at each corner, comparing it to the previously determined GVW and GAW, and alerting the driver if any of these limits have been exceeded.

Furthermore, exceeding this critical safety value can cause the system to provide a signal to lock the transmission shifter in Park or Neutral, prevent the vehicle from being driven, until cargo/passengers can be removed, lowering the chassis below the GVWR or GAWR limit. For instance, a signal can pass, such as through the vehicle's CAN (Controller Area Network) to the BTSI (Brake Transmission Shift Interlock) to keep the transmission from shifting out of "Park."

Many fatal aircraft accidents have occurred due to improper loading of passengers, baggage and fuel in general aviation aircraft. Not only do aircraft have a maximum allowed loaded weight, but they also must maintain a proper balance of the weight relative to the CG of the aircraft, to ensure it is controllable under all flying conditions. Too much weight in the rear of an aircraft will shift the CG rearward, making recovery from an aerodynamic stall impossible, from which there is no recovery. Having FSR technology in the seats and luggage compartment, connected to a measuring and reporting module, and taking fuel load into account, can help ensure proper weight and balance has been achieved before flight. Airlines rely on statistical averages for passenger weight calculations when determining weight and balance. FSR technology in the seats along with seat belt buckle sensors could improve the weight and balance calculations, along with ensuring passengers are buckled prior to take-off and landing.

Using FSR technology in the seat base of the wheelchair can allow the disabled person to more easily weigh themselves, vs. trying to use a conventional weight scale which requires moving the passenger. Many wheelchair lifts have a weight limit that is exceeded due to inaccurate weight approximations, thus endangering both the wheelchair rider and the operator.

A variety of occupant sensor configurations, can be used, according to this invention. Single Point—this is the simplest implementation utilizing a single small sensor, centrally located such that sitting anywhere on the seat tends to apply force to the sensor, so the occupant can be detected. Multi-Point—similar to the widely used multiple contact closure approach, except that FSR's can be used in place of the switch closure concept. Sheet—FSR Velostat material can be used in sheet form, substantially covering most of the seat bottom cushion. By placing flex circuit conductors in contact with Velostat, the force sensitive resistance of the material can be measured. This solution is effective in detecting occupant sitting on the front, side, or rear edges of the seat.

In one embodiment, the FSR is connected as one of two resistors making up a simple voltage divider. The voltage divider is connected to a reference voltage, such as 5V, and ground. The middle node between the resistors is connected to an analog to digital input of a microprocessor. The microprocessor can read or sense the voltage presented at this input and convert it into a number which represents the analog voltage read on this input. The microprocessor can convert this reading through formulas or a look up table to the force applied to the seat.

The problem with the current binary occupant sensor contact technology is that the seat sensor must be custom designed for each seat design, the type of foam, the seat base or pan, upholstery, etc. The sensor layout needs to extend to side bolsters if present, far back, far forward, etc. Using variable force sensing technology allows for adapting a single sensor design to many different seat types.

The polymer material used for the force sensing resistors described above is appropriate for loads less than a few hundred pounds. Using different, less compressible or semi-compressible material can provide low cost load sensing for much higher loads as well. Typically, more expensive and harder to read load cells are used for heavier loads, but the system cost can be prohibitive in many applications.

Infusing conductive carbon atoms or material into various non-conducting materials of various compressibilities can yield a force sensitive material used for a multitude of applications, including but not limited to the force on each individual wheel on a vehicle, or the combined weight on an axle. This can be used to determine when a vehicle is loaded beyond its GVWR or GAWR rating.

The material need not necessarily be a thin sheet, but could also be in the form of a rubber or polyurethane block or other suspension member as are frequently used now in vehicle suspension components. Load cell technology involves lengthening and shortening of fine conductors which produces small resistance changes which are difficult to measure accurately. Force sensitive resistive material can exhibit resistance changes from near infinite to just a few ohms, which is a very large and easy to sense dynamic range, thus reducing system cost over current load cell technology.

The force sensitive resistive material does not have to provide a linear response in resistance to applied load. It's an easy matter with microprocessor firmware to use a look up table or formulas to linearize or calibrate the output to produce a value equivalent to the load or force applied.

OBJECTS OF THE INVENTION

Accordingly, a primary object of the present invention is to allow measuring the approximate weight of an object placed on a seat.

Another object of the present invention is to allow differentiating between lower weight objects placed in a seat vs. a human occupant.

Another object of the present invention is to allow changing the threshold between low weight children occupants, such as in a school bus, and adult occupants, which allows more accurate determination of occupant presence. In one embodiment, changing this sensing threshold could by managed dynamically by a school bus driver if the seat sensors report the weight sensed to a centralized tablet in the front of the bus. The tablet would display whether a human occupant is in the seat, based on the reported weight. Increasing the weight threshold with heavier passengers, such as high school students vs. elementary students, could eliminate false triggers when passengers place heavy backpacks in a seat. Changing the occupant sensing threshold is especially helpful for eliminating false triggers when a bus is used for both elementary aged riders, high school riders and adult passengers.

Another object of the present invention is to use analog force sensing technology to compensate for differences in particular seat designs, without having to redesign a custom contact sensor for each new seat design.

Another object of the present invention in one form is to allow measuring and calculating the approximate total weight of all occupants in the vehicle.

Another object of the present invention in one form is to allow automatically adding the total occupant weight in the vehicle to the known empty weight of the vehicle to know the total loaded vehicle weight.

Another object of the present invention in one form is to allow alerting the vehicle operator if the GVWR of the vehicle may be exceeded every time the vehicle is loaded.

Another object of the present invention in one form is to provide total vehicle weight information which can be used to trigger locking the vehicle transmission in Park if the GVWR is exceeded, preventing driving the vehicle in an unsafe condition.

Another object of the present invention is to use force sensitive occupant sensors to eliminate the need for complex physical layout patterns currently used with binary open/closed contact type sensors in contoured seats with bolsters and other features.

Another object of the present invention is to use force sensitive occupant sensors to eliminate the need to custom design a new layout pattern for each new seat design as is required for contact type occupant sensors.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIG. 1) is directed to a variable force resistor which provides one form of analog force sensor strategically located between a seat cushion 20 and a seat support 30 to evaluate weight loads placed upon the seat cushion 20. Along with other sensors, valuable information can be provided to an operator of a vehicle, to assist in safely operating the vehicle.

Figure 1:
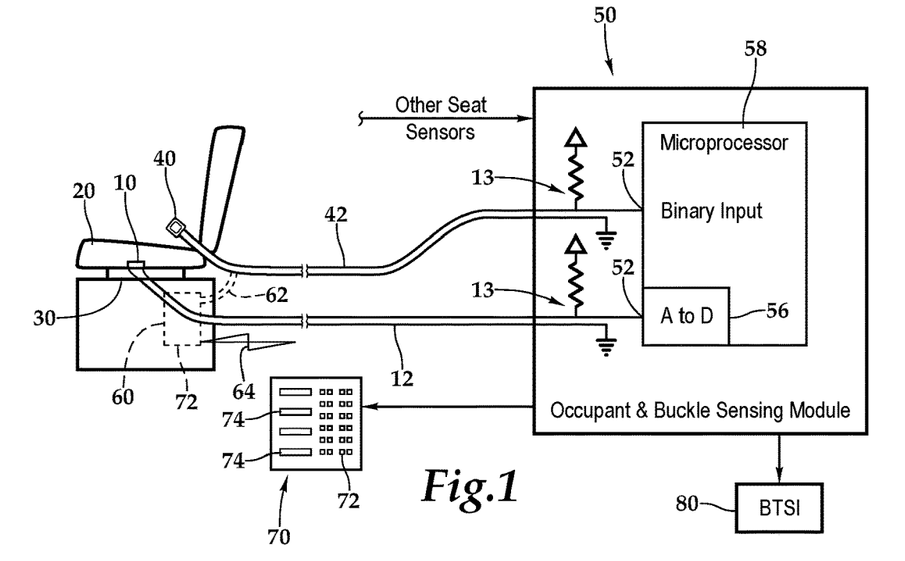
FIG. 1 is a schematic of a vehicle seat and associated sensors, as well as a processing module, display and interface with other vehicle systems according to various embodiments of this invention.

In essence, and with particular reference to FIG. 1, basic details of the invention are described. At least one variable force resistor 10 is placed between a seat cushion 20 and seat support 30. A seatbelt buckle 40 associated with each seat can also be included within a system of this invention. A primary sensing module 50 receives signals from the variable force resistor 10 and optionally also from the buckle 40 to indicate seat buckle latch status and weight upon the seat cushion 20. This primary sensing module 50 can communicate relevant information to a display 70 preferably of a touchscreen variety, allowing an operator to interact with the display 70 to customize the system and communicate which seats on the vehicle present a potentially dangerous condition, such as a seat being occupied but without seatbelt in use. As an alternative, a distributed sensing module 60 can be associated with each seat, or a subset of seats, and provide some processing at a location of the seat, and then communicating, such as wirelessly or by wire to the primary sensing module 50 or at least to a microprocessor 58 communicating with the display 70. In one embodiment, a brake transmission shift interrupt (BTSI) is coupled to the primary sensing module 50 or other microprocessor 58 to lock the vehicle in a park status if unacceptable conditions are indicated by the system. Vehicles which could utilize a system of this invention include buses 90 and aircraft 92, as well as other vehicles.

By way of introduction, and in various embodiments, this invention takes advantage of the use of analog force sensing technology used as an occupant sensor in a seat, as opposed to the binary switch closure technology in use today. Analog force sensing provides a number of advantages. The force or weight of the object in the seat can be measured, allowing an adjustable threshold to be used in determining the presence of a human occupant. This can be helpful in eliminating false triggers due to non-human objects placed on a seat. Analog force sensing allows dynamically changing the threshold depending on average vehicle rider weight, such as in school buses for children vs. adults. It also allows estimating the total weight of all occupants present on the vehicle, which can be added to the known empty vehicle weight, and used to determine if the vehicle's GVWR is being exceeded, helping to ensure safer vehicle operation. This same weight estimation technique can be used in aircraft for determining safe weight and balance calculations prior to flight. This can also be applied to ferry boats to assist in safe loading and operation.

More specifically, and with continuing reference to FIGS. 1-5, particular details of this invention, according to one embodiment and some variations thereof, are disclosed in greater detail. Each seat generally includes a seat support 30 with a seat cushion 20 located above the seat support 30. The seat support 30 is shown herein as a small structure resting upon a larger pedestal, but the seat support 30 could be considered as merely an upper portion of such a pedestal. Furthermore, the seat support 30 could really be a reference surface within a lower portion of the seat cushion 20, with a critical sensing area for the variable force resistor 10 of this invention being any location between an upper surface of the seat cushion 20 and lower portions of the seat structure, either within the seat cushion 20 or below the seat cushion 20. For purposes of this invention, the seat cushion 20 is generally defined as that portion of the seat which is above the variable force resistor 10 and the seat support 30 is generally described as that portion of the seat which is below the variable force resistor 10. Sensing is provided between the seat cushion 20 and seat support 30 of compression forces acting upon the variable force resistor 10, resulting in a variable output correlating with weight force of objects resting upon the seat cushion 20.

Figure 2:
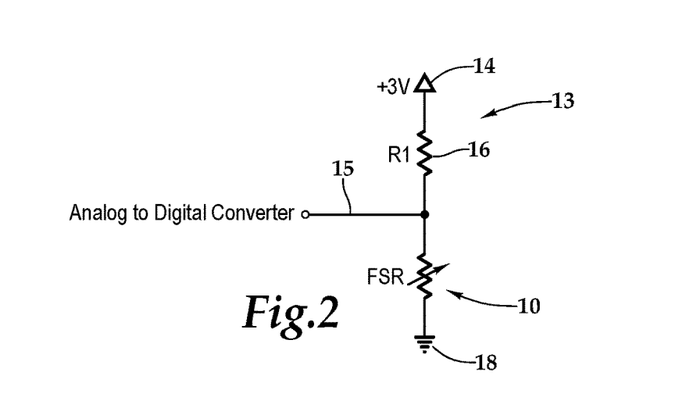
FIG. 2 is a circuit schematic for a basic voltage divider circuit useful to collect weight related data from sensors such as variable force resistors.
Figure 3:
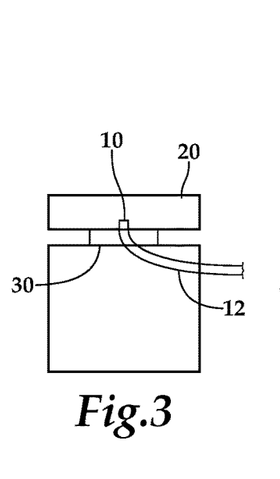
FIG. 3 is a detail of a portion of that which is shown in FIG. 1 according to an alternative embodiment.

The variable force resistor 10 is preferably configured within a circuit which is generally configured as a voltage divider 13. Wiring 12 couples this voltage divider 13 to a microprocessor 58 within a primary sensing module 50 (or alternatively passes a signal to a distributed sensing module 60 either at the seat itself or to some sub-location between the primary sensing module 50 and the seat).

Each voltage divider 13 includes an input voltage 14 in series with a reference resistor 16. A junction is provided on a side of the references resistor 16 opposite the input voltage 14, which leads to an output 15. This junction also has a path coupled to variable force resistor 10 in series with ground 18. This basic voltage divider 13 causes the output 15 to generally receive a signal which correlates with resistance sensed by the variable force resistor 10. The variable force resistor 10 can also be referred to as a force sensitive resistor ("FSR"). The correlation can be linear or non-linear and directly or inversely related.

In one embodiment (FIGS. 1 and 3), a single variable force resistor 10 in a single discreet position is located between the seat cushion 20 and seat support 30. If necessary, the single variable force resistor 10 can be calibrated, through calibration of outputs from the voltage divider 13, so that meaningful information correlating with weight force upon the seat cushion 20 is outputted.

In a slightly alternative embodiment (FIG. 4), a series of variable force resistors 10 are provided between the seat cushion 20 and seat support 30. This array of variable force resistors 10 could be provided in a linear array or in a two-dimensional array with some variable force resistors 10 closer to a front of the seat cushion 20, some variable force resistors 10 closer the rear of the seat cushion 20, and some variable force resistors 10 located closer to the left lateral side and/or right lateral side of the seat cushion 20. These variable force resistors 10 would be coupled to their own voltage divider 13 and these multiple signals would then be combined, typically by summing thereof, to arrive at total weight force upon the seat cushion 20. In another embodiment, calibration would occur to correlate outputs from such variable force resistors 10 with weight forces placed upon the seat cushion 20. Such calibration would typically be performed a single time for each seat cushion 20 and seat support 30 style.

Figure 4:
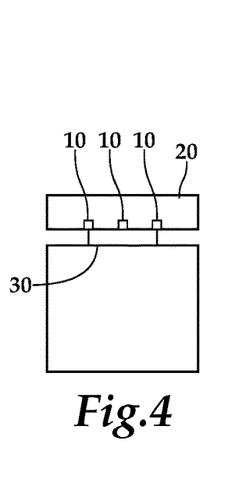
FIG. 4 is a detail the portion of that was shown in FIG. 3 according to a further alternative embodiment.
Figure 5:
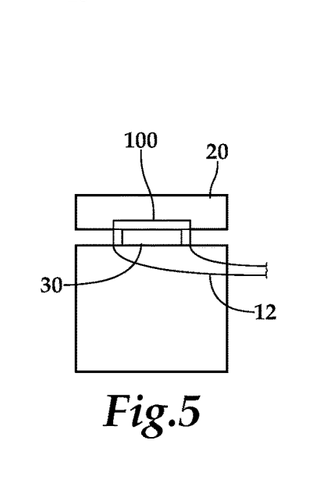
FIG. 5 is a detail of a portion of that which is shown in FIG. 3 according to a still further embodiment.

If the variable force resistors 10 have a non-linear output, such as with a doubling of resistance not necessarily halving the force output value, such non-linear output can be "linearized" by running the non-linear outputs through a formula to linearize the outputs, or utilizing a look up table so that accurate weight outputs correlate with the variable force resistor 10 measurements. Such linearization of data output could be done individually for each variable force resistor 10 and associated individual voltage divider 13, or such linearity procedures could occur after combination of inputs from multiple variable force resistors 10 and multiple voltage dividers 13 associated therewith, such as within the microprocessor 58 of the primary sensing module 50, or occurring within a distributed sensing module 60 associated with each seat or a subset of all seats upon a vehicle.

In a further alternative embodiment, (FIG. 5), a single large variable force resistor 100 is provided, but this large variable force resistor 100 is large in area so that it accumulates a total force value for forces placed upon the seat cushion 20 over a surface area spanned by the variable force resistor 10. Input from such a large variable force resistor 100 (FIG. 5) can then be calibrated to account for shape and size of the large variable resistor 100 and particular geometric and materials properties details of the seat cushion 20 and/or seat support 30, to provide accurate output therefrom. Any non-linearity can also be compensated for by utilization of an appropriate formula or look up table, as discussed above, but customized for the large variable force resistor 100.

Most preferably, and with reference to FIG. 1, the primary sensing module 50 (or distributed sensing module) also receives a signal from a buckle 40 associated with each seat, through wiring 42 (or a binary input 62 to the distributed sensing module 60). In this way, microprocessor 58 associated with the primary sensory module 50 (or distributed sensing module 60) can further determine for each seat if the potentially dangerous condition is present of weight being sensed indicative of an occupant, and the seatbelt buckle 40 not being latched. The latch within the buckle 40 is typically a binary sensor which merely sends a signal indicative that the latch is closed or that the latch is open. In contrast, wiring 12 from the variable force resistors 10 enter the microprocessor 58 through an analog input 54 either within the primary sensing module 50 or a distributed sensing module 60.

The microprocessor 58 or other intermediate device converts the analog input 54 into a digital signal which can then be manipulated by the microprocessor 58. The microprocessor 58 could be a single microprocessor at a central location or could be multiple microprocessors 58, some at a central location (or at least one) and with other microprocessors at the distributed sensing module 60 located at distributed locations, such as at each seat, or at each row of seats, or at some other subset of seats. The distributed sensing module 60 would typically include a transmitter 64 (or wiring) to send signals from the distributed sensing module 60 to a microprocessor 58 at the primary sensing module 50 or other central location for further processing.

The primary sensing module 50 and/or microprocessor 58 are coupled to a display 70 for outputting of information gathered from the variable force resistor 10 associated with each seat, as well as buckle 40 latching status information, and potentially other information. Some such information can be pre-processed before being passed to the display 70. The display 70 can also act as an input device when the display 70 is in the form of a touch display. Other forms of inputs could alternatively be utilized, such as keyboards, a pointer control device (e.g. mouse, trackpad, joystick, etc.) voice input, or other control inputs.

In one embodiment, the display 70 is a touch display which includes seating spaces 72 thereon and control spaces 74 thereon. The seating spaces 72 can be color-coded or otherwise coded to indicate their status. Codes could include whether the seat is occupied or not, whether non-individual occupant loads are resting upon the seats, and the status of any seatbelts from the buckle 40 latch sensors. Some statuses for these individual seats can be indicative of a warning condition, such as when loads sensed thereon indicate an individual occupant, but the seat belt buckle 40 is signaling that it is not latched. Warning status could be in the form of a particular color, such as red, or could flash or could include audible tone generation to warn an operator of seats which are generating warnings.

An operator would typically have an opportunity to perform a visual inspection to verify conditions at any seat, such as a seat receiving a warning code on the display 70. An occupant can be instructed to "buckle up" or a large heavy backpack on the seat can be responded to by adjusting a threshold value for the seat to a higher level, so that the system is properly recognizing that no unsafe condition exists, even though a relatively heavy load is resting on the seat. For airplanes (as an example), such a heavy seat load, corresponding with a non-occupant, might result in instructions to place the item under the seat or in an overhead bin, or in checked baggage, to comply with safety protocols.

Control spaces 74 can be touched to pull up screens which allow for adjusting of threshold values for each seat or which can convert the display to outputting different types of relevant information. One option would be to display total seat load weight and to compare this amount with unloaded vehicle weight and gross vehicle weight rating (GVWR) information to ensure that the vehicle is not overloaded. Such a calculation could automatically be performed, in at least one embodiment, and a warning signal generated when the vehicle is potentially overloaded.

In one embodiment, such an overload condition could interact with the brake transmission shift interrupt (BTSI) of the vehicle to lock the vehicle in park (or otherwise prevent operation) until the vehicle is not overloaded. In such a configuration, a potential overload warning could be communicated, typically through a CAN (Controller Area Network) bus of the vehicle, which would also be coupled to the BTSI, to cause the vehicle to be prevented from shifting out of park. Other control spaces 74 on the touch display 70 could interact with the microprocessor 58 (and potentially memory and other sensors or equipment associated with microprocessor 58) to perform functions such as calibration and/or adjustment of individual variable force resistors 10 associated with individual seats 30 and for any other tuning or adjustments to the system.

Figure 6:
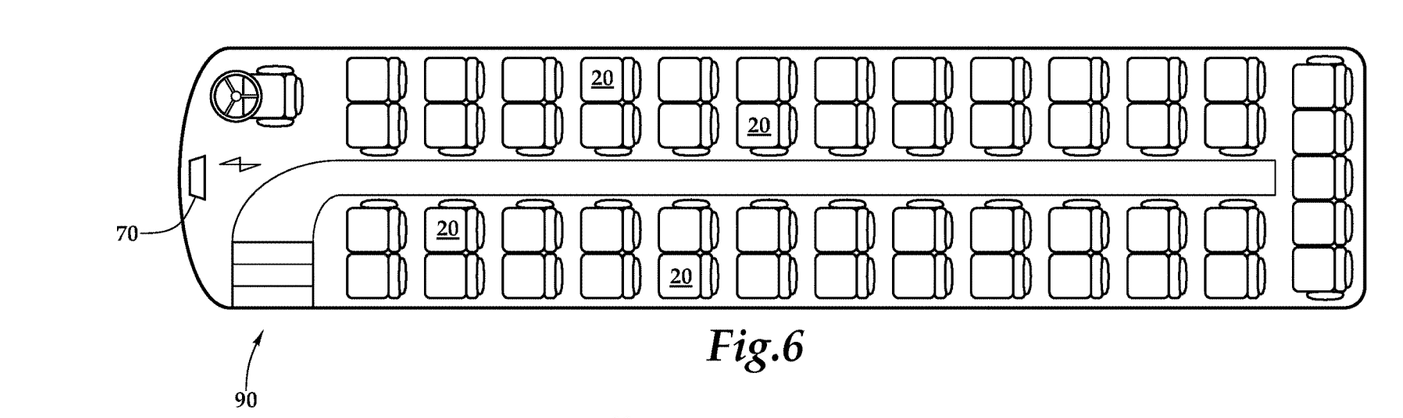
FIG. 6 is a top plan view of a bus type vehicle showing seat locations which could be fitted with sensors in one implementation of a system and method of this invention.
Figure 7:
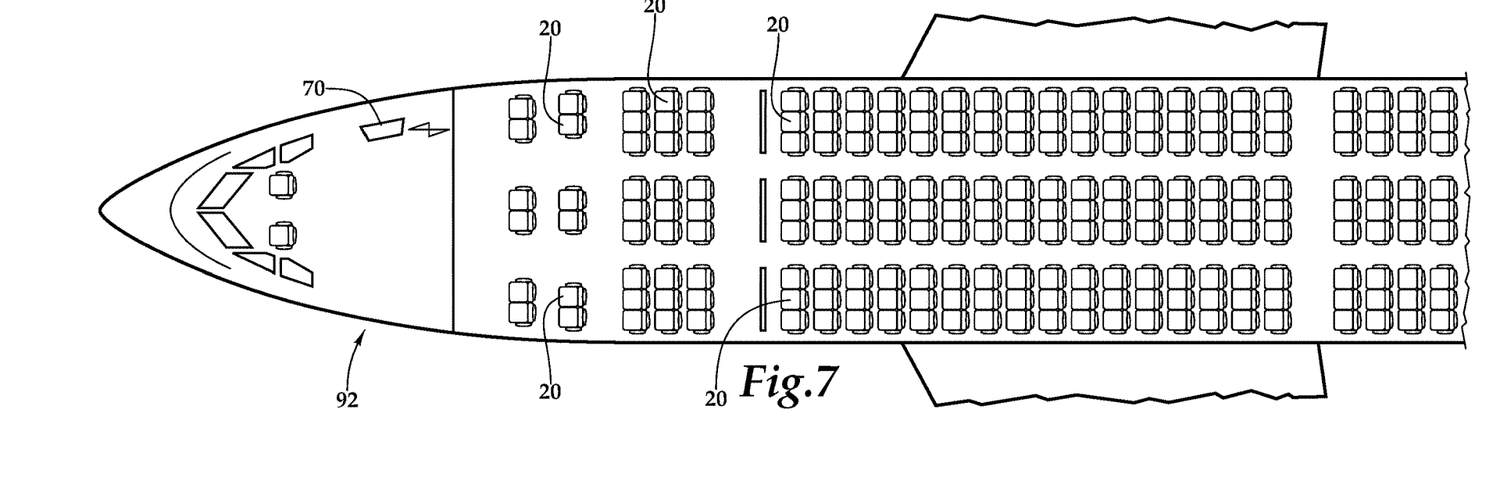
FIG. 7 is a top plan view of an aircraft type of vehicle showing seat locations which could be fitted with sensors in a second implementation of a system and method of this invention.

With particular reference to FIGS. 6 and 7, a system 10 according to this invention is integrated into a bus 90 or aircraft 92, while other types of vehicles (e.g. ferries) could also have their seating configured with sensors and systems to optimize operation thereof. In the case of aircraft, not only can occupant individuals be verified as wearing their seatbelts in a latched fashion, but also a center of gravity associated with a seated load of the aircraft can be calculated. In this way, load calculations for the vehicle and center of gravity calculations for the vehicle can be fine-tuned to ensure that they are properly within acceptable parameters to maintain safe and efficient operation of the aircraft.

The display 70 on a bus 90 can be positioned where the driver can see it. Thus, any warning statuses for any of the seats 72 depicted on the display 70 can be readily seen by the driver. Typically a warning signal is indicative of a seat which is sensing weight indicating that an occupant is upon the seat, and a seatbelt sensor is indicating that a seatbelt is unlatched. When such a condition occurs, the operator has a series of options. As one option, the operator could utilize a rearview mirror, camera, or look over the shoulder, to see if the seat is in fact occupied. If not occupied, the warning signal could (as one option) merely be ignored.

As a further option, the driver or other authorized personnel could visit the seat location which is indicating such a warning condition. A visual inspection at the seat location might determine a variety of things. In one instance, an occupant is seated on a seat without a seatbelt latched. The occupant can be instructed to latch the seatbelt. In another instance, the seatbelt might be seen as latched, which might indicate improper use of the seatbelt or a defect in the seatbelt or seat belt latch sensor, which might warrant unlatching and re-latching the seatbelt, or notifying maintenance personnel.

In a further instance, visual inspection might discover that no occupant is upon the seat, but rather some other weight, such as a heavy backpack or gym bag, or briefcase. In such an instance, if the bag is safely positioned on the seat, the operator can either turn off the warning signal through the display, or adjust a threshold value for provision of such a warning, to only cause a warning when a greater weight is sensed, with adjustment occurring until the unoccupied seat no longer indicates a warning condition.

In another instance, the total number of vehicle occupants might be determined, such as by counting the individuals either automatically or manually as the individuals board the bus or other vehicle. The display can calculate a number of seats which are "occupied" as determined by the seat sensors, indicating a weight above a threshold value. If the number of individuals boarding the bus is greater than the number of seats which are identified as being occupied, the display can be placed into a mode which identifies seats which have the largest sensed weights which are below threshold values indicative of an occupant. These seats can then be visually inspected to see if any lightweight individuals are sufficiently light that they are not above the threshold value indicative of an occupant for the seat. Adjustment can then occur, such as through the display, to lower the threshold value until any such lightweight individuals are properly being identified as occupying the seat. With such a methodology, lightweight individuals can be verified as being properly belted in their seat, as well as heavy individuals.

On such a bus type of vehicle, total seated weight can be determined by combining sensed weight values for each of the seats. Such a total seated weight can be utilized, such as along with empty vehicle weight, to determine if a gross vehicle weight rating (GVWR) has been exceeded. If any such maximum values have been exceeded, or if seatbelts are not being properly utilized, as an option, the system of this invention could interact with the BTSI to lock the vehicle in park (or neutral or other non-drivable setting) until any such warning conditions have been corrected.

In another embodiment, if seats are fitted with airbags or other passive restraints, safety considerations can be taken into account to optimize performance of such passive restraint systems. For instance, lighter weight individuals might have airbags deploy with lesser force. Seats which are not occupied might have no triggering of passive restraint deployment. Other customization of safety or other systems associated with the vehicle could also be adjusted in accordance with whether an occupant is detected or not upon the seat.

Display 70 on such an aircraft could be in a cockpit location for interaction by a pilot, copilot or other cockpit crew. As an alternative (or in addition), such a display 70 can be provided at a location within a cabin of the airplane, where a flight attendant or other authorized personnel can view such a display 70 to ensure that passengers are properly seated and buckled, such as at particular times during a flight. Often such times where sitting status is important include during takeoff and landing or when encountering turbulence. In a long flight is not uncommon for passengers to be sleeping, and for periods of turbulence to be encountered. Flight attendants within the cabin then check to ensure that passengers have their seatbelts latched. The display 70 and system of this invention would quickly identify which seats are occupied and with seatbelts latched. Because individuals often move about the cabin during such long flights, such a system can quickly identify seats within the aircraft which should be the highest priority for flight attendants within the cabin to visit, to verify the passengers are properly restrained. While visual inspection is often most accurate, the system of this invention can provide a beneficial tool for most efficiently performing such visual inspections. While the displays 70 are depicted within the bus 90 and aircraft 92 as communicating wirelessly, such displays 70 could be physically wired into a primary sensing module 50 or a distributed sensing module 60 to provide communication into and out of the display 70.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A system for measuring seat occupancy status, comprising in combination:
   an analog force sensor between a lower seat structure of a seat and an upper seat structure of said seat located above said lower seat structure;
   said analog force sensor outputting to a processor a signal correlating with weight force of an item placed upon said seat above said upper seat structure; and
   said processor having an adjustable threshold value for comparison to a signal value from said analog force sensor, with the processor indicating an occupied condition for said seat, depending on whether said signal value is above or below said adjustable threshold value;
   further including a seatbelt latch sensor coupled to said processor, said processor outputting a warning signal when said signal value is above said threshold value and said seatbelt latch sensor indicates said seatbelt latch is unlatched;
   wherein a plurality of seats are provided with at least one of said analog force sensors associated with each of said seats, said plurality of seats located within a common vehicle, said vehicle including a display, said display communicating information from said analog force sensors in a manner correlated with said seats with which said analog force sensors are associated;
   wherein a warning signal is associated with said display, said warning signal indicating which of said plurality of seats detects a weight force through said at least one analog force sensor associated with each of said seats which is indicative of a passenger being located upon said seat and said seatbelt latch sensor associated with said seat indicating that said seatbelt latch is unlatched; and
   wherein said adjustable threshold value of said processor includes a plurality of separate adjustable threshold values, at least two of said separate adjustable threshold values associated with at least two of said plurality of seats.

2. The system of claim 1 wherein said vehicle including said processor coupled to said analog force sensors to calculate an approximate weight of occupants and other objects upon said seats, to calculate an approximate weight added to a vehicle.

3. The system of claim 2 wherein a known empty weight of the vehicle is added to the approximate weight added to the vehicle, to evaluate if a gross vehicle weight rating has been exceeded.

4. The system of claim 2 wherein said processor is coupled to a brake transmission shift interlock of the vehicle, and wherein the brake transmission shift interlock is restricted to a non-operating status when a gross vehicle weight rating for the vehicle is indicated as having been exceeded by the sensors.

5. The system of claim 1 wherein said display provides at least a portion of an input device for adjusting said plurality of separate adjustable threshold values.

6. The system of claim 5 wherein said display depicts a plurality of seats thereon, with said display providing at least a portion of an input device for adjusting said separate adjustable threshold values for at least two of said plurality of seats depicted on said display.

7. The system of claim 6 wherein said display is a touch display, such that said display also provides said input device through touching by a user.

8. The system of claim 6 wherein said input device includes at least a portion thereof which is separate from said display and interacts with said display to allow adjustment of said separate adjustable threshold values for at least two of said plurality of seats.

9. The system of claim 8 wherein said portion of said input device which is separate from said display includes a trackpad.

10. The system of claim 8 wherein said portion of said input device which is separate from said display includes a joystick.

\* \* \* \* \*